United States Patent
Robinson et al.

(10) Patent No.: US 6,924,566 B2
(45) Date of Patent: Aug. 2, 2005

(54) METHOD FOR ASSURING START-UP OF SPAN-POWERED TELECOMMUNICATION SYSTEMS

(75) Inventors: Steven M. Robinson, Madison, AL (US); Ralph R. Boudreaux, Jr., Madison, AL (US); John S. McGary, Petersburg, TN (US)

(73) Assignee: Adtran, Inc., Huntsville, AL (US)

( * ) Notice: Subject to any disclaimer, the term of this patent is extended or adjusted under 35 U.S.C. 154(b) by 547 days.

(21) Appl. No.: 10/212,956

(22) Filed: Aug. 6, 2002

(65) Prior Publication Data

US 2003/0030327 A1 Feb. 13, 2003

Related U.S. Application Data

(60) Provisional application No. 60/310,888, filed on Aug. 8, 2001.

(51) Int. Cl.[7] .................................................. H02J 3/06
(52) U.S. Cl. ............................................ 307/38; 307/37
(58) Field of Search .............................. 307/36, 37, 38; 379/348, 395.01

(56) References Cited

U.S. PATENT DOCUMENTS 3,290,451 A * 12/1966 Jasper ..................... 379/22.03

* cited by examiner

Primary Examiner—Brian Sircus
Assistant Examiner—Brett Squires
(74) Attorney, Agent, or Firm—Allen, Dyer, Doppelt, Milbrath & Gilchrist, P.A.

(57) ABSTRACT

A electrical power control mechanism ensures start-up of all telecommunication devices (repeaters and a remote terminal) along a span-powered wireline. Input voltage start-up thresholds of power control circuits at the devices are higher than the steady-state voltage across the repeater closest to the span supply, when the span voltage is at a minimum DC wireline voltage that sustains operation of all devices. The maximum input voltage start-up threshold of a device is less than the maximum voltage that could be applied during start-up, and the remote terminal has an input voltage start-up threshold value higher than that of any repeater. The maximum standby current of each device is specified, and input power is limited to its steady state maximum during start-up.

20 Claims, 5 Drawing Sheets

METHOD FOR ASSURING START-UP OF SPAN-POWERED TELECOMMUNICATION SYSTEMS

CROSS-REFERENCE TO RELATED APPLICATION

The present application claims the benefit of U.S. Provisional Application, Ser. No. 60/310,888, filed Aug. 8, 2001, entitled: "Method for Assuring Start-up of Span-Powered Telecommunication Systems," by S. Robinson et al, assigned to the assignee of the present application, and the disclosure of which is incorporated herein.

FIELD OF THE INVENTION

The present invention relates in general to electrical power management systems and subsystems therefor, and is particularly directed to a new and improved electrical power start-up control mechanism for telecommunication equipment span-powered by way of a wireline link from a power source installed at a facility, such as a central office. The start-up power control mechanism of the invention is operative to establish, a priori, all system parameters that will ensure successful start-up of all span-powered elements, including all repeaters and a remote terminal.

BACKGROUND OF THE INVENTION

In addition to sending voice and/or data over a telephone wireline pair, a telecommunication service provider may use the same pair of wires to supply electrical power to various utility devices/circuits, including, but not limited to repeaters that are distributed along the wireline, and terminal devices that remotely terminate the line. The power used to operate such equipment via the wireline pair is customarily sourced from the telephone company's central office (CO). This method of powering equipment from the line is commonly referred to as 'loop'- or 'span'-powering, and enables the phone companies to remotely power equipment installed up to several miles from the central office.

Although DC voltage and power requirements for a line-powering supply (part of the central office terminal) are well understood, characteristics that ensure successful start-up of the multiple elements that make up the system have not been fully appreciated to date, due in part to the fact that there are numerous modes of start-up failure. Auspiciously, start-up failure of line-powered systems has not been a significant problem in the past. Moreover, in general, it has not been difficult to construct multi-element line-powered systems, which are effectively free of start-up problems. In addition, even when start-up problems were evident, they were typically not difficult to resolve.

Unfortunately, this apparent ease of span-powered system implementation has allowed system designers to avoid having to fully understand the requirements for successful start-up and sustained operation of a multi-element span-powered system. Factors that have facilitated the implementation of such networks include the time delaying function of the input capacitance of the line-powered elements (which delays the voltage across line elements as the span voltage rises) and the delay time or ramp-up time in the power consumed by a line-powered element (which lowers the span voltage requirements to achieve successful start-up).

Despite the fact that line-powered, multiple element start-up has not been a pervasive problem to date, in order to be able to specify inter-operability of terminal equipment from multiple manufacturers, and thereby comply with projected industry standards, start-up requirements must be understood and quantified.

SUMMARY OF THE INVENTION

In accordance with the present invention, this objective is successfully addressed by a start-up power control mechanism that is configured to establish, a priori, all system parameters that will ensure successful start-up of all span-powered elements, including all repeaters and a remote terminal. Pursuant to a first aspect of the invention, the source of DC voltage used to power the span is set at a DC voltage value that is at least equal to or greater than a critical voltage. The critical voltage corresponds to the minimum DC voltage that will sustain operation of all of the span-powered devices. This voltage is a function of the number of line-powered devices, the input power of each device, and the resistance of each line segment (between successive devices) of the span system. This is a requirement for steady state operation.

A second feature of the invention involves setting the input voltage start-up threshold of each of span-powered device at a voltage that is greater than the steady-state voltage across the upstream-most device (repeater), namely, the device which is closest to the source of DC voltage, when the wireline voltage equals the critical voltage. As repeater units are interchangeable they have the same start-up threshold, which is set to accommodate the first or upstream-most repeater, which has the most restrictive requirements.

In accordance with a preferred embodiment, the start-up voltage threshold of the line-powered elements is established by the use of circuit that performs an under-voltage lock-out (UVLO) function, and which does not allow its associated span-powered device to remain energized when the input voltage falls below that device's turn-on point; namely, the UVLO is configured to have a hysteretic turn-on, turn-off characteristic. The UVLO may include a programmable voltage reference device that provides a prescribed voltage reference to one input of a comparator, a second input of which is coupled to monitor the span voltage. A feedback voltage divider network is coupled with the comparator so as to set respective turn-on and turn-off thresholds and define the desired hysteretic characteristic for the UVLO circuit.

Prior to the application of span power, the output of the comparator is maintained in a first state that prevents the unit's power supply from start-up. As the span voltage increases and reaches the UVLO turn-on threshold, the output of the comparator changes state, and the unit's power supply starts up. Due to the hysteretic characteristic of the comparator, the span voltage must drop to a turn-off threshold lower than at the original start-up threshold, before the UVLO circuit will shut off the unit.

Pursuant to a third attribute of the invention, the input voltage start-up threshold of the remote terminal is preferably set to be higher than that of the repeaters. Although this is not necessary to ensure successful start-up, it ensures 'hiccup-less' start-up.

According to a fourth component of the invention, the maximum input voltage start-up threshold of each line-powered element is set at a value that is less than the maximum voltage that could be applied across that element during start-up. For example, if the start-up threshold of the remote terminal exceeds the steady state voltage across the last or downstream-most repeater after all other repeaters have started up, the remote terminal will not start. As repeater units (from the same manufacturer) have effectively the same design, the maximum start-up threshold is defined by the last repeater position, since it will see the lowest input voltage of the repeaters (i.e., the last repeater is the most restrictive case).

A fifth aspect of successful start-up is to specify the maximum standby current of a line-powered unit to ensure the start-up voltage of a unit can be attained. Standby current is current that is drawn by a unit that fails to start; such standby current produces a voltage drop in the line resistance, to further reduce the voltage across the unit.

According to a sixth feature of the invention, the input power of each line-powered unit is limited to its steady state maximum during start-up. The input power can become its maximum value at the instant of start-up, but it cannot be allowed to overshoot. It is preferable to define start-up interoperability in terms of static voltage start-up thresholds. However, these thresholds are dependent on the power drawn by the span-powered elements of the system. If one or more of the elements draws more than the power allotted during start-up, then the start-up thresholds may be too low for successful start-up. To avoid this problem, the input power is defined so that it never exceeds its steady state maximum (the value upon which the thresholds are based).

In accordance with a preferred embodiment, power generated by a respective span-powered device's supply circuitry is ramped up in a controlled manner by the use of a 'soft-start' circuit that is coupled to the input of that device's flyback power supply. The use of a soft-start power supply virtually eliminates overvoltage at the initial portion of output voltage and power characteristics, and the input power never exceeds the steady state value.

DETAILED DESCRIPTION

Before detailing the start-up power management scheme of present invention, it should be observed that the invention resides primarily in what is effectively a prescribed combination of discrete circuit components used for span-powered applications, and associated signaling interfaces, plus modular arrangements of conventional communication circuits and signal processing components and attendant supervisory control circuitry therefor, that controls the operations of such circuits and components. In a practical implementation that facilitates their incorporation with span-powered equipment, these modular arrangements may be readily implemented as application specific integrated circuit (ASIC) chip sets.

Consequently, the configuration of these circuits and components and the manner in which they are interfaced with associated power supply components for repeater and remote communication equipment, and a powered span provided by the telephone company, have been illustrated in the drawings by readily understandable block diagrams and associated circuit schematics, which show only those specific details that are pertinent to the present invention, so as not to obscure the disclosure with details which will be readily apparent to those skilled in the art having the benefit of present description. Thus, the diagrammatic and circuit illustrations of the Figures are primarily intended to illustrate the major components of a span-powered telecommunication system controlled by the invention in a convenient functional grouping, whereby the present invention may be more readily understood.

In order to facilitate an appreciation of the methodology of the start-up power management scheme of the invention, and the manner in which an existing span-powered system may be augmented to implement that methodology, a non-limiting example of a three-element span-powered system, diagrammatically shown in FIG. 1, will be described. It should be noted however, that the present invention is not limited to this or any particular number of span-power units that may be distributed along and remotely (central office) powered by a telecommunication wireline pair. The choice of two repeaters and a remote terminal is for purposes of reducing the complexity of the drawings and their attendant description.

Figure 1:
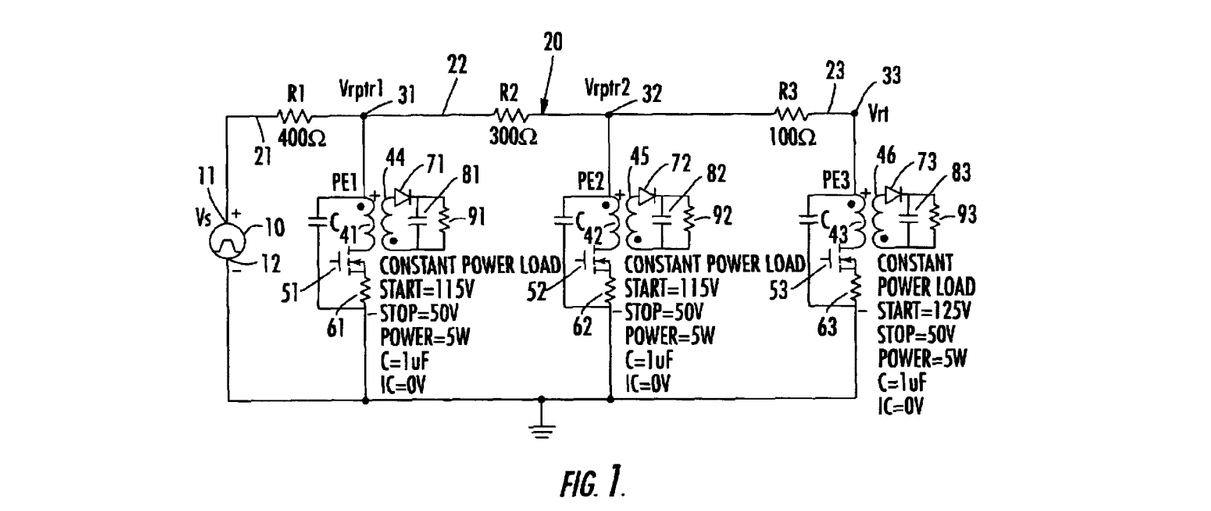
FIG. 1 diagrammatically illustrates a three-element span-powered telecommunication system for demonstrating the functionality and operation of the start-up power management mechanism of the present invention.

Referring now to FIG. 1, a simplified example of a the three element span-powered system shown therein includes a DC power source 10 (which is typically located in a central office facility), having respective (+/−) terminals 11/12 coupled to (Tip/Ring) portions of a metallic wireline pair or span 20. Distributed along the powered span 20 are a first (closest to the DC power supply 10) powered element (e.g., repeater) PE1, a second (farther away) powered element (e.g., repeater) PE2, and a third (remote and farthest away from the DC power supply 10) powered element PE3. The wireline 20 has a first segment 21 between the DC power source 10 and a node 31 to which the first powered element PE1 is coupled, segment 21 having a resistance R1 (400 ohms, as a non-limiting example). A second segment 22 of the wireline 20 extends between node 31 and a node 32, to which the second powered element PE2 is coupled, and is denoted by a resistance R2 (having a value of 300 ohms, as a non-limiting example). Finally, a third segment 23 of the wireline 20 extends between node 32 and a node 33, to which the third powered element PE3 is coupled, and is denoted by a resistance R3 (having a value of 100 ohms, as a non-limiting example).

Span power-coupling interfaces for the repeaters PE1/PE2 and remote terminal PE3 are shown as having respective primary transformer windings 41/42/43 coupled in series with MOSFET switch elements 51/52/53 and coupling resistors 61/62/63 between the tip and ring portions of the span 20, and across which capacitors C are coupled. Respective secondary windings 44/45/46 of the transformers are coupled through rectifier elements 71/72/73 to associated storage capacitors 81/82/83 to which loads, denoted by resistors 91/92/93, are coupled.

These components compose basic, single-output flyback converters, the design and operation of which is well known to one skilled in the art of power conversion. They represent the power conversion process for converting voltage from the span network to voltages usable by the line-powered element. Since these power converters provide constant voltage outputs and the load on them is near constant (in steady-state), then the input power to each line-powered element is constant (over its input voltage range). The actual implementation of the power interface is not important, but that it presents a constant power load to the span is pivotal. For the purposes of start-up analysis, the line powering elements can be described by the following attributes:

START: The voltage across the line-powered element at which the element will begin operation as a constant power load to the span;

STOP: The voltage across the line-powered element at which the element will stop operation as a constant power load to the span;

POWER: The power in Watts that the line-powered element draws from the span network when it is active;

C: The input capacitance of the line-powered element; and

IC: The initial voltage of the line-powered element.

Figure 2:
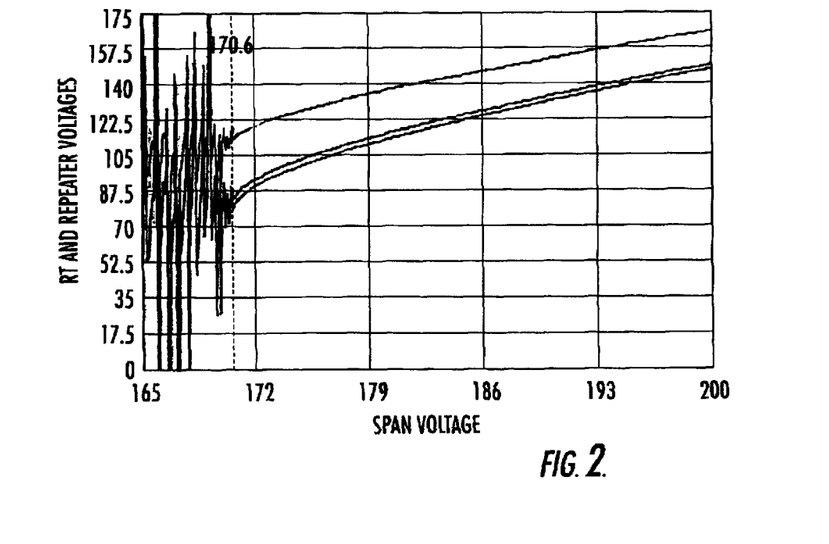
FIG. 2 graphically illustrates repeater and remote terminal voltages of the system of FIG. 1 as a function of the span voltage.

FIG. 2 shows the repeater and remote terminal voltages as a function of the span voltage Vs sourced from the DC supply 10. As shown therein, in order to sustain operation of all line powered units (PE1, PE2 and PE3), the DC span voltage Vs output by DC supply 10 must be at least equal to 170.6 VDC. As described above, this minimum operation-sustaining voltage in accordance with a first aspect of the invention is termed the 'critical voltage, and is a function of the number of line-powered elements (three in the illustrated example), the input power of each element (e.g., 5 W), and the resistance of each line segment of the span system. This is actually a requirement for steady state operation. From the powered element vs. span voltage characteristic of FIG. 2, for a critical span voltage of 170.6 VDC, the associated node voltages (at nodes 31, 32 and 33) of the system of FIG. 1 are: Vrptr1=113.71 VDC; Vrptr2=84.234 VDC; Vrt=80.344 VDC.

As described briefly above, a second aspect of ensuring start-up in accordance with the methodology of the invention requires that the input voltage start-up threshold of each line-powered unit be set at a value that is greater than the steady-state voltage across the first line-powered element (first or upstream-most (closest to the DC supply) repeater), when the span voltage is equal to its critical value. Since the various repeater units are interchangeable, they have essentially the same start-up threshold, which is set to accommodate the first repeater which has the most restrictive requirements. Therefore, from FIG. 2, the start-up threshold of each of the powered elements PE2 and PE3 downstream of the first repeater PE1 is defined so as to be greater than the steady state voltage (Vrptr1=113.71 VDC in the present example) of the first repeater PE1, when the span supply is at its critical value of 170.6 VDC. For purposes of providing a practical threshold value for the parameters of the present example of FIGS. 1 and 2, this repeater start-up threshold voltage may be set at a value of 115 VDC.

The start-up voltage threshold of the line-powered elements may be readily implemented by any number of circuits that perform an under-voltage lock-out (UVLO) function. While the design and construction of such circuits is straightforward for one skilled in the art, for the thresholding functionality in the present invention, it is desirable for UVLO circuits to be accurate and not draw much current (in order to minimize the stand-by current). The circuit must also allow the span-powered unit/element to remain energized, when the input voltage falls below that unit's turn-on point (i.e., it must have a hysteretic turn-on, turn-off characteristic).

Figure 3:
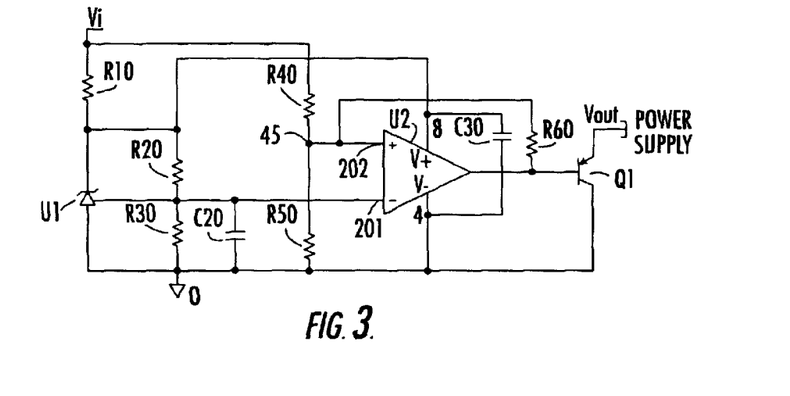
FIG. 3 schematically illustrates a non-limiting example of an under-voltage lock-out circuit that may be employed in the span powered elements of a telecommunication system.

A non-limiting example of a circuit that may be provided for this purpose in both the repeater and remote terminal is shown schematically in FIG. 3. An input terminal Vi is coupled to the unit's associated span node; for example, for the case of the repeater PE1 in the three-element system of FIG. 1, input terminal Vi is coupled to node 31. A second terminal Vo is referenced to ground or zero volts, as shown. The input terminal Vi is coupled through a current limiting resistor R10, to the cathode of a programmable voltage reference diode U1, the anode of which is coupled to Vo. Resistor R10 provides current-limiting from the input voltage terminal Vi (which is a fairly high voltage relative to the operating voltage of voltage reference diode U1 and a voltage comparator U2). Voltage reference diode U1 provides a prescribed voltage reference (e.g., 2.5 VDC) input to the inverting (−) terminal 201 of comparator U2. Comparator U2 preferably comprises a low quiescent current comparator with internal output drive.

Resistors R20 and R30 form a voltage divider between resistor R10 and ground, and set the cathode voltage of diode U1 at a value higher than the reference voltage supplied by diode U1 so as to provide comparator U2 with operating 'headroom', and make the output of comparator U2 sufficiently high to reverse bias an output (PNP) transistor Q1. Output transistor Q1 interfaces the UVLO circuit to the control circuit of the unit's power supply.

Resistors R40 and R50 are coupled in series between the input terminal Vi and Vo, and have their common node 45 coupled to the non-inverting (+) input 202 of comparator U2, and to a resistor R60, which is coupled to the output of comparator U2. Resistors R40, R50 and R60 are used to scale the input voltage Vi, so as to set turn-on and turn-off thresholds of the UVLO circuit. Capacitors C20 and C30 provide noise decoupling.

Until the span voltage reaches its prescribed turn-on threshold, the voltage at the non-inverting (+) input terminal 202 of voltage comparator U2 is less than the reference voltage (at inverting (−) terminal 201), so that the output of comparator U2 is low. As a result, transistor Q1 is initially forward biased in a turned-on condition, as to provide a low resistance current flow path between its collector and emitter, thereby keeping its emitter pulled low. This, in turn, keeps the power supply control terminal Vout pulled low, so that unit's power supply cannot start up.

In this mode, the resistors R50 and R60 are effectively coupled in parallel and form a voltage divider with resistor R40. This serves to scale the value of the input voltage at the non-inverting (+) input 202 of comparator U2 for comparison to the reference value applied to its inverting (−) input terminal 201. As the value of the span voltage applied to input terminal Vi increases, the voltage at the non-inverting terminal (+) 202 of comparator U2 becomes greater than the reference voltage, so that the output of comparator U2 transitions from low to high. This low-to-high switching of the output of comparator U2, reverse-biases the base-emitter junction of transistor Q1, causing transistor Q1 to turn off, allowing the power supply control terminal to operate normally. With its power supply control terminal no longer pulled low, that unit's power supply starts up.

Since the output of comparator U2 is now high, the voltage at the non-inverting (+) terminal 202 of comparator U2 is increased to a higher voltage than prior to the turn-on transition. This means that the input voltage Vi must drop to a turn-off threshold (e.g., 50 VDC) that is lower than at the original start-up threshold, before the output Vout will again change state (pulled low again), and the UVLO circuit will shut off the unit.

According to a third aspect of the invention, the input voltage start-up threshold of the remote terminal PE3 is set to be higher than that of the upstream repeaters PE1 and PE2. As pointed out previously, while this is not absolutely necessary for a successful start-up, it helps implement a "hiccup-less" start-up. For purposes of providing a practical threshold value for the parameters of the present example of FIGS. 1 and 2, with a repeater start-up threshold voltage having been set at 115 VDC, the remote terminal start-up voltage may be 125 VDC.

Figure 4:
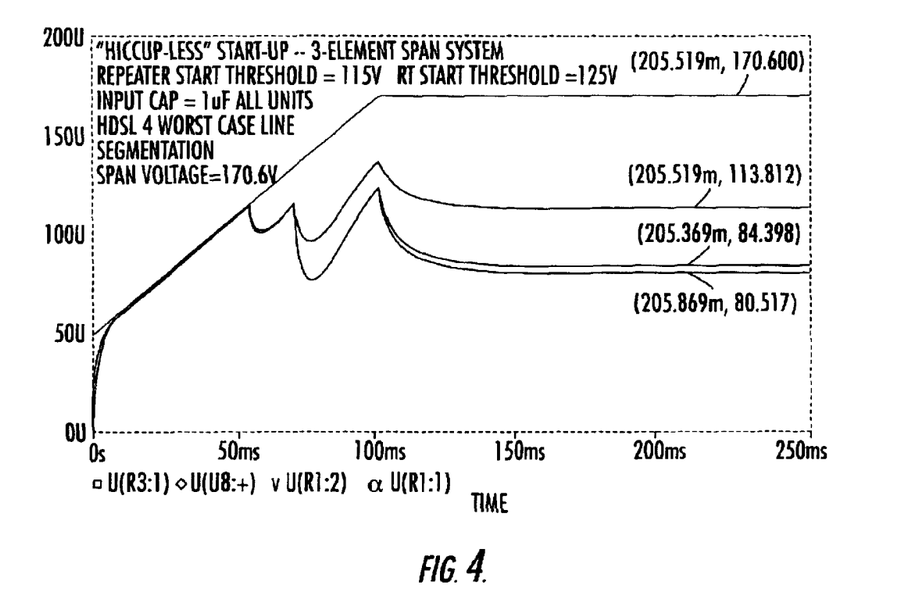
FIG. 4 graphically shows the variation of span voltage with time for the successful start-up of the system of FIG. 1, together with associated threshold voltage parameters.

FIG. 4 graphically shows the variation of span voltage with time for the successful start-up of the system of FIG. 1 (Vs=170.6V), and the threshold voltage parameters described above.

A fourth aspect of the invention is to set the maximum input voltage start-up threshold of each line-powered element at a value that is less than the maximum voltage which could possibly be impressed across that element during start-up. For example, if the start-up threshold of the remote terminal (element PE3 in FIG. 1) exceeds the steady state voltage across the last or downstream-most repeater (element PE2) after all the repeaters have started up, then the remote terminal will not start. Since it can be reasonably inferred that repeater units (from the same manufacturer) will have effectively the same design, the maximum start threshold is established by the last repeater position, as the last repeater down the span will see the lowest input voltage of the repeaters (the most restrictive case).

Namely, the maximum start-up voltage is established by analyzing how high the voltage of each node can become. In this analysis it is assumed that one or more of the line-powered units fails to turn on, and that the remaining units are operational, which serves to reduce the voltage across any units that have not started. Moreover, the units that fail to start will draw some amount of 'standby' current; this standby current will, in turn, produce a voltage drop in the line resistance, so as to further reduce the voltage across the unit. As a fifth aspect of the invention, the standby current of each line-powered unit must be specified in determining the maximum start thresholds and thus its maximum value must be specified.

In the example shown in FIG. 4, the voltage across the remote terminal (element PE3) reaches a value of 129 VDC when the repeaters become powered, and the standby current of the remote terminal is 5 mA. Thus, the above choice of 125 VDC for the remote terminal start-up voltage is marginal, and does not provide much tolerance. This situation may be improved if the span voltage Vs has a value higher than the critical value. If the remote terminal PE3 and the first repeater PE1 start up before the second repeater PE2 starts, then the second repeater's input voltage can increase to 145 VDC. Thus, the maximum repeater voltage can be substantially higher.

The start-up voltage of the remote unit does not have to be higher than the 'start-up' voltage of the repeater. It only has to be higher than the 'steady state' voltage across the immediately previous or upstream element, when the span voltage is equal to its critical value. Therefore, for the parameters of the present example, the minimum start-up voltage of the remote terminal PE3 must be greater than 84.34 VDC. If the remote terminal start-up voltage is less than the repeater start-up voltage, 'hiccuping' may occur until the span voltage reaches critical voltage; however, start-up will ultimately be successful.

A sixth aspect of the invention is to limit the input power of a line-powered unit to its steady state maximum during start-up. The input power can become its maximum value at the instant of start-up, but it cannot be allowed to overshoot. To keep the standardization process simple it is preferable to define start-up interoperability in terms of static voltage start-up thresholds. However, these thresholds are dependent on the power drawn by the elements of the system. If one or more of the span-powered elements draws more than the power allotted during start-up, then the start-up thresholds may be too low for successful start-up. The simplest way to prevent this from happening is to ensure that input power never exceeds its steady state maximum (the value upon which the thresholds are based).

As with the UVLO circuit of FIG. 3, described above, there are numerous ways to accomplish this. As a non-limiting example, a relatively simple and cost effective method is to adequately 'soft-start' the unit's power supply. That is, the output power should ramp up in a controlled manner. This method only addresses transient input power of the unit's power supply. It does not address temporary higher power operating modes of the signal circuitry (such as memory initialization, LED tests, and the like). These may be addressed by recalculating the start-up thresholds.

Figure 5:
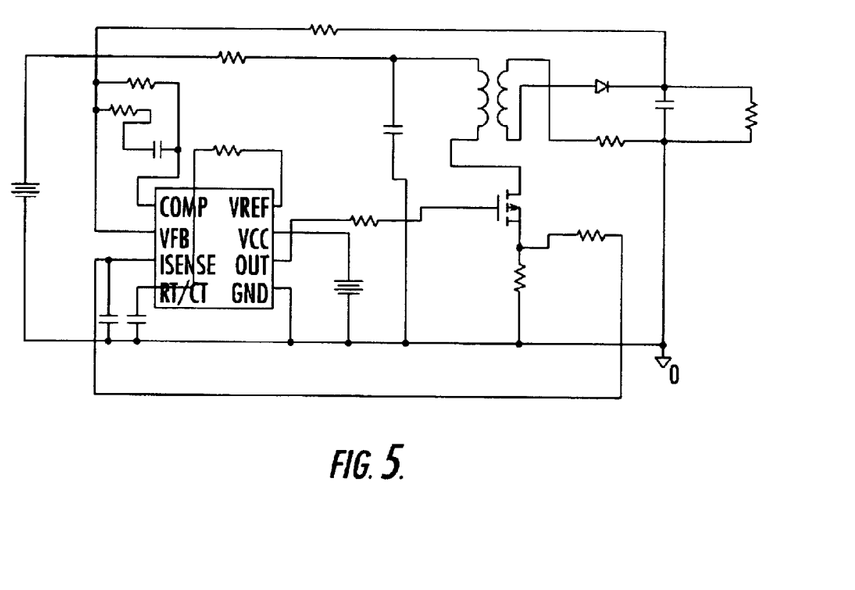
FIG. 5 shows a conventional flyback pulse width modulator (PWM)-based, power supply circuit having no soft-start and a slow control loop.
Figure 6:
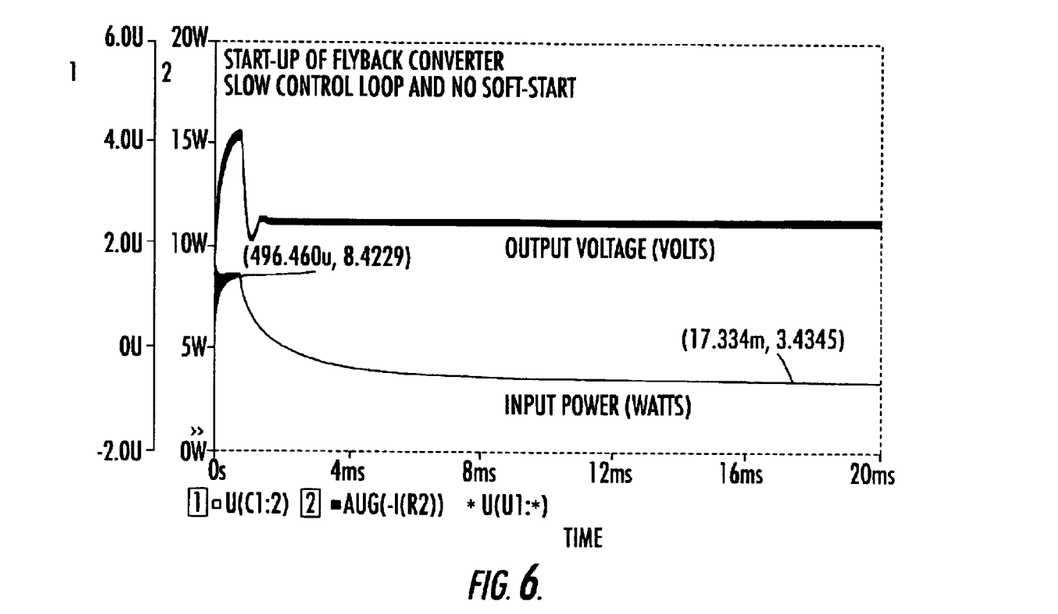
FIG. 6 graphically illustrates the presence of undesirable start-up overshoots in the variation of input power/output voltage with time when using the power supply circuit of FIG. 5.

FIG. 5 shows a conventional flyback pulse width modulator (PWM)-based, power supply circuit having no soft-start and a slow control loop, so that the output voltage (and the input power) undesirably overshoots substantially during start-up, as shown in the associated input power/output voltage-vs-time diagram of FIG. 6. Since the configuration and operation of the circuit of FIG. 5 are well known to one skilled in the art, no additional elaboration will be presented here.

Figure 7:
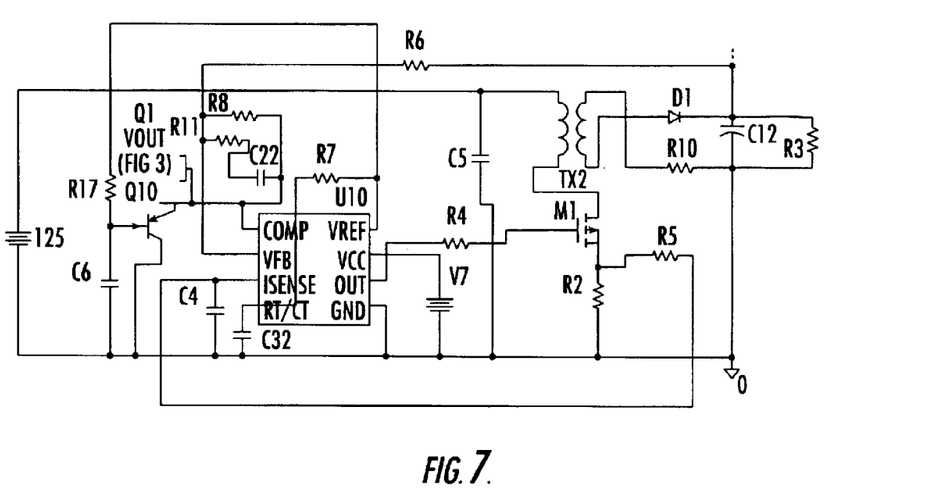
FIG. 7 shows a modification of the PWM-based flyback circuit of FIG. 5, to implement a soft-start of the power supply and avoid start-up overshoots.

Instead, attention is directed to FIG. 7, which shows a modification of the PWM-based flyback circuit of FIG. 5, to include additional components that implement a soft start of the power supply. As shown in FIG. 7, the flyback power supply circuit includes a standard pulse width modulator (PWM) U10 having its COMP port coupled to the emitter of an input PNP transistor Q10 and through a resistor R8 to its voltage feedback VFB port. The COMP port of PWM U10 is coupled to the output terminal Vout of the UVLO circuit of FIG. 3 described above. Alternatively, the Vout terminal could be connected to the base of transistor Q10. In addition, resistor R8 is coupled through resistor R11 and capacitor C22 to the COMP port, and through resistor R6 to output node V. The collector of transistor Q10 is coupled to ground, while its base is coupled to a slow start/integrator filter comprised of a capacitor C6 (referenced to ground) and a resistor R17, which is coupled to the VREF port of pulse generator chip U10. The RT/CT port of pulse generator U10 is coupled through a resistor R7 to its VREF port, and through a capacitor C32 to ground.

The current sense input port ISENSE of PWM U10 is coupled through a capacitor C4 to ground and through a resistor R5 to the source-drain current flow path of MOSFET M1, which is coupled in series with resistor R22 to ground. The gate drive input of MOSFET M1 is coupled through resistor R4 to the output port OUT of PWM chip U10. Chip U10 has its ground reference port GND coupled to ground and its DC supply port VCC coupled to a VCC supply.

The source-drain current flow path of MOSFET M1 is further coupled in series with the primary winding of transformer TX2, which is connected to the span wireline shown as a 125 VDC value. The secondary winding of transformer TX2 is coupled through rectifier diode D11 and resistor R10 to a load, shown as resistor R32 and a capacitor C12. Capacitor C5 is the input capacitance of the powered element.

Figure 8:
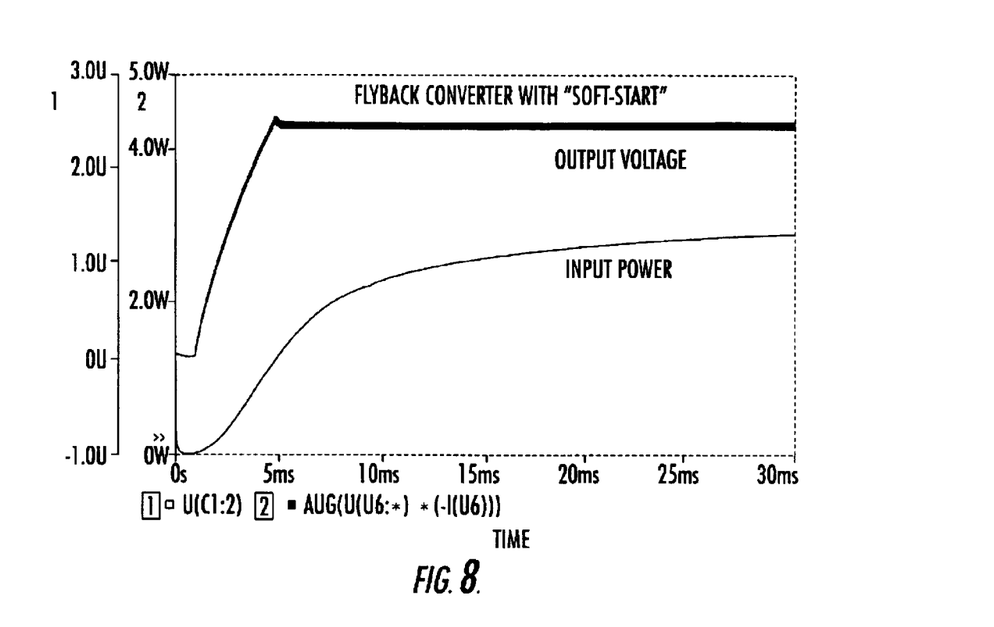
FIG. 8 graphically illustrates the variation of input power/output voltage with time when using the soft start-modified power supply circuit of FIG. 7.

In operation, as the power supply begins to start-up, the COMP port of pulse generator U10 is held low by transistor Q10, which is in a turned-on state, due to the forward bias applied to its base-emitter junction by capacitor C6. The voltage on the COMP port is proportional to the duty cycle of pulse signal produced at the PWM output port OUT, which drives the MOSFET switch M1, as described above. This duty cycle is related to the output voltage and power, such that as the duty cycle of the pulse signal increases, so does the output voltage. As capacitor C6 charges via R17 and transistor Q1 the duty cycle increases. This, it turn, gradually increases the output voltage. As a result, there is no overvoltage at the initial portion of the output voltage and power characteristics, as shown in FIG. 8. Thus, start-up over-voltage is virtually eliminated and the input power never exceeds the steady state value.

It may be noted that a variety of methods, including analytical, numerical and circuit simulation techniques, may be used to calculate the steady state node voltages that are necessary to determine the desired start-up thresholds. For systems with only one line-powered element, analytical (closed form) solutions are relatively easy to determine. For two element (repeater and remote terminal) systems, analytical solutions are more computationally intensive. For systems having three or more line-powered elements (multiple repeaters and a remote terminal, as in the example of FIG. 1) analytical solutions may be employed, but require even more extensive calculations. Numerical (iterative) methods facilitate the calculation of the requisite circuit voltages and currents for any number of elements. A non-limiting example of a MATHCAD-based (MATHCAD is a registered Trademark of MathWorks, Inc.) iterative routine for identifying the critical span voltage, node voltages and other electrical parameters of a span power system is set forth in an Appendix attached herewith.

Figure 9:
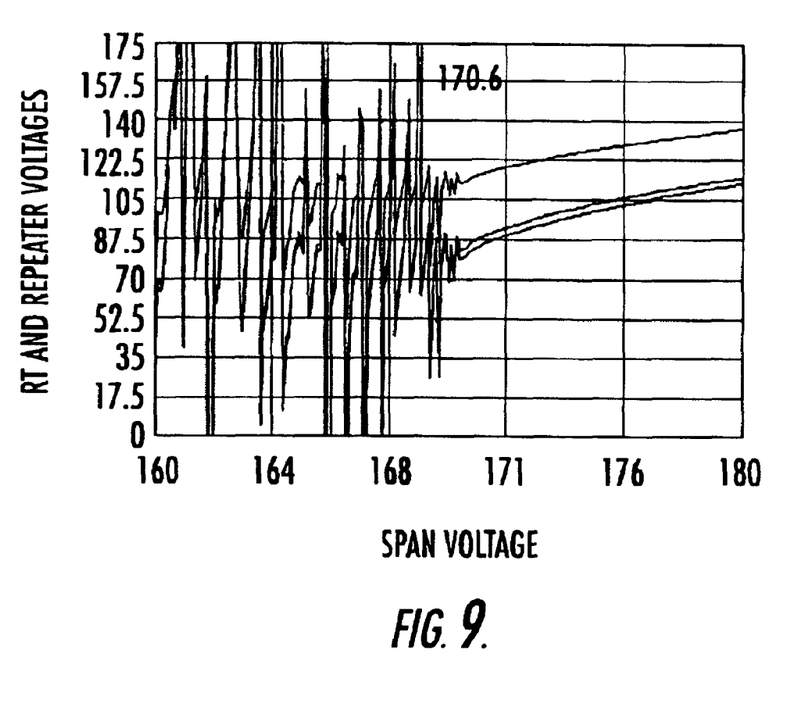
FIG. 9 shows variations of repeater and remote terminal voltages as a function of span voltage over Vco sweep range.

FIG. 9 shows the variations of repeater and remote terminal voltages over the Vco sweep range. The critical value of Vco (170.6 VDC) is readily identified and is the lowest value of Vco where the node voltages display coherent results. The node voltages and span current at the critical span voltage are readily derived by displaying each quantity at the critical voltage as shown below.

Vrptr1(170.6)=113.71

Vrptr2(170.6)=84.234

Vrt(170.6)=80.344

Ico(170.6)=0.142

Pspan:=Ico(170.6)*170.6

Pspan=24.264

As will be appreciated from the foregoing description, the electrical power start-up control mechanism of the present invention ensures successful start-up of all telecommunication devices (repeaters and a remote terminal) distributed along a span powered wireline. Input voltage start-up thresholds of power control circuits at the devices are greater than the steady-state voltage across the device closest to the span supply, when the span voltage is equal to the minimum DC wireline voltage that will sustain operation of all devices. In addition, the maximum input voltage start-up threshold of a device is less than the maximum voltage that could be applied across that device during start-up, and the remote terminal has an input voltage start-up threshold value higher than that of any repeater.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of controlling electrical power start-up of a plurality of electrically powered utility devices distributed along a wireline that is coupled to a source of DC voltage, said method comprising the steps of:

(a) causing said source of DC voltage to output a DC wireline voltage that is at least equal to or greater than a critical voltage, said critical voltage corresponding to a minimum DC wireline voltage that will sustain operation of all of said utility devices; and (b) establishing the input voltage start-up threshold of each of said utility devices to be greater than the steady-state voltage across that one of said utility devices that is closest to said source of DC voltage, when said DC wireline voltage is equal to said critical voltage.

2. The method according to claim 1, further including the step of:

(c) establishing the maximum input voltage start-up threshold of each utility device at a voltage value that is less than the maximum voltage that could be applied across said each utility device during start-up.

3. The method according to claim 2, further including the step of:

(d) establishing the input voltage start-up threshold of that one of said utility devices that is farthest away from said source of DC voltage at a value that is higher than that of any other of said utility devices.

4. The method according to claim 3, further including the step of:

(e) limiting the input power of each of said utility devices to its steady state maximum during start-up.

5. The method according to claim 4, further including the step of:

(f) limiting the maximum standby current of each utility device.

6. The method according to claim 2, wherein step (c) comprises, at a respective utility device, monitoring the wireline voltage at said respective utility device, and maintaining said respective utility device turned-off until the monitored wireline voltage at said respective utility device has reached an input voltage start-up threshold of said respective utility device.

7. The method according to claim 6, wherein step (c) further includes maintaining said respective utility device turned-on, until said monitored wireline voltage has dropped below an input voltage turn-off threshold of said respective utility device, said input voltage turn-off threshold being different from said input voltage start-up threshold.

8. The method according to claim 1, further including the step of:

(c) establishing the input voltage start-up threshold of that one of said utility devices that is farthest away from said source of DC voltage at a value that is higher than that of any other of said utility devices.

9. The method according to claim 1, further including the step of:

(c) limiting the input power of each of said utility devices to its steady state maximum during start-up, and limiting the maximum standby current of each utility device.

10. The method according to claim 1, wherein said wireline comprises a telecommunication wireline coupled to said source of DC voltage at a telecommunication facility and said plurality of electrically powered utility devices include a remote terminal device, and at least one telecommunication repeater coupled to a location of said wireline between said telecommunication facility and said remote terminal device.

11. The method according to claim 1, wherein step (b) comprises controllably increasing power applied to a respective utility device, in a manner that effectively prevents an overshoot at an initial portion of utility device voltage and power characteristic, and prevents said utility device voltage from exceeding a steady state value thereof.

12. A system for supplying electrical power to a plurality of electrically powered utility devices distributed along a wireline, comprising:
a source of DC voltage coupled to said wireline and being operative to apply to said wireline a DC wireline voltage that is at least equal to or greater than a critical voltage, said critical voltage corresponding to a minimum DC wireline voltage that will sustain operation of all of said utility devices; and
power control circuits installed with respective utility devices and being operative to establish input voltage start-up thresholds of said respective utility devices that are greater than the steady-state voltage across that utility device closest to said source of DC voltage, when said DC wireline voltage is equal to said critical voltage.

13. The system according to claim 12, wherein said wireline comprises a telecommunication wireline coupled to said source of DC voltage at a telecommunication facility and said plurality of electrically powered utility devices include a remote terminal device, and at least one telecommunication repeater coupled to a location of said wireline between said telecommunication facility and said remote terminal device.

14. The system according to claim 12, wherein a respective power control circuit is operative to establish a maximum input voltage start-up threshold of an associated utility device at a voltage value less than the maximum voltage that could be applied across said associated utility device during start-up.

15. The system according to claim 14, wherein said power control circuit is operative to limit the input power of said associated utility device to its steady state maximum during start-up.

16. The system according to claim 15, wherein said respective power control circuit is operative to limit the maximum standby current of said associated utility device.

17. The system according to claim 12, wherein the power control circuit of that one of said utility devices that is farthest away from said source of DC voltage has an input voltage start-up threshold value higher than that of any other of said utility devices.

18. The system according to claim 12, wherein a respective power control circuit is operative to monitor the wireline voltage, and maintain its associated utility device turned-off, until the monitored wireline voltage has reached a input voltage start-up threshold of said respective utility device.

19. The system according to claim 18, wherein said respective power control circuit is operative to maintain its associated utility device turned-on, until said monitored wireline voltage has dropped below an input voltage turn-off threshold of said respective utility device, said input voltage turn-off threshold being different from said input voltage start-up threshold.

20. The system according to claim 12, wherein a respective power control circuit includes a soft-start mechanism that is operative to controllably increase power for its associated utility device, in a manner that effectively prevents an overshoot at an initial portion of utility device voltage and power characteristic, and prevents said utility device input power from exceeding a steady state value thereof.

* * * * *